June 17, 1930. R. H. MOULTON 1,764,970
PORTABLE GREASE DISPENSER
Filed Dec. 1, 1926
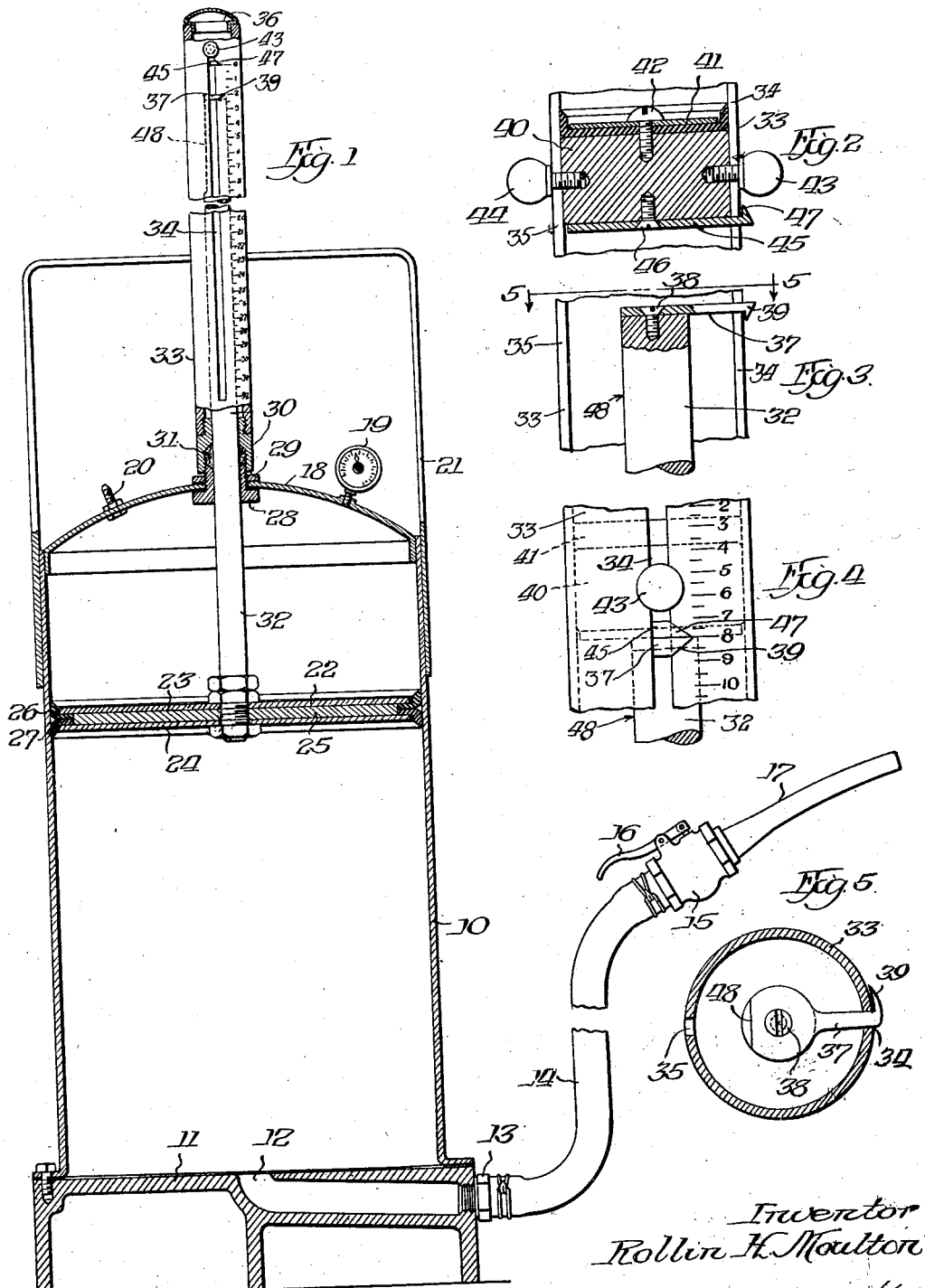

Patented June 17, 1930

1,764,970

UNITED STATES PATENT OFFICE

ROLLIN H. MOULTON, OF BERWYN, ILLINOIS

PORTABLE GREASE DISPENSER

Application filed December 1, 1926. Serial No. 151,924.

My invention relates to a portable grease dispenser and has particular reference to a portable device for the purpose of forcing lubricant, preferably in a plastic form, to working parts of devices, as into transmission and differential gear housings of automobiles.

An object of my invention is the provision of a portable grease dispenser in which the quantity of grease forced therefrom is measured to the customer so that a proper charge may be made to the customer based upon the service rendered and the quantity of lubricant which is supplied to each customer.

Another object of my invention is the provision of a grease dispenser which is easy and simple in operation and which can be easily moved from place to place so that one workman may easily handle the device in applying lubricant to the transmission and differentials of automobiles.

Still another object of my invention is the provision of a portable grease dispenser which is operable by fluid pressure, preferably compressed air, and which allows the fluid pressure to escape from the lubricant container when the container is empty, so that no damage will result to the parts of the dispenser.

A further object is to provide a device for dispensing fluids or semi-fluids so constructed that quantities of the contents may be progressively and accurately measured.

With these and various other objects in view, the invention consists of certain novel features of construction and operation as will be more fully described and particularly pointed out in the specification, drawings and claims appended hereto.

In the drawings, wherein like reference characters are used to designate like parts.

Figure 1 is a vertical sectional elevation of my improved dispenser;

Figure 2 is a detailed sectional view of a part of the measuring device;

Figure 3 is a detailed sectional view of another part of the measuring device;

Figure 4 is a detailed elevational view of a section of the measuring device taken at right angles to the view shown in Figure 3; and Figure 5 is a sectional plan of a part of the measuring device, the same being taken substantially in the plane as indicated by the lines 5—5 of Figure 3.

A cylindrical container 10 is provided which is mounted upon a base 11 in any suitable manner, said base having a conduit 12 centrally located with respect thereto and extending outward towards one side of the base 11 where an externally threaded nipple 13 is provided in threaded engagement with the base 11 in alignment with the conduit 12, a flexible hose 14 of any desired length being secured to the nipple 13 in any suitable manner. At the free end of the hose, a valve 15 is provided, operable by a handle 16, with a nozzle 17 projecting outward from said valve and through which the lubricant is dispensed as into the differential and transmission gear housings of an automobile. The container 10 has a cover 18 secured to the upper end thereof in any suitable manner with a pressure indicating gauge 19 affixed thereto and a fluid valve 20 secured to said cover in any suitable manner to allow a fluid, such as compressed air or the like, to be forced into the container 10, the gauge 19 indicating the internal pressure of the fluid in the container 10. A bail 21 is secured to the container 10 to allow for easy handling and transportation of the apparatus where desired.

Loosely positioned in the container 10 is a piston or follower designated as a whole as 22, and comprising an upper plate 23, a lower plate 24, and a center member 25, with a pair of oppositely turned annular flexible members 26 and 27 respectively, being placed between the upper plate 22 and lower plate 24 around their outer edges, these members being held in close sliding engagement at the inner sides of the container 10 so that the compressed fluid in the upper part will not leak to the lower chamber and the lubricant in the lower chamber will not leak past the piston 22 into the upper part of the container 10. The cover 18 has a central opening therein within which an externally threaded gland member 28 is fitted, the cover having a reinforcing member 29 thereon which may be threaded to the gland member 28, said gland member being in threaded engagement with an upper cooperating gland member 30. Suitable packing 31 is interposed in an annular chamber around a rod 32 secured at its lower end to the piston 22 and extending upward through the gland members 28 and 30 into an upwardly projecting pipe 33 which is internally threaded at its lower end and fitted into threaded engagement with the upper end of the gland member 30.

The tube 33 has a front slot 34 formed therein and a rear slot 35, and has a cap 36 positioned in the upper end thereof in any suitable manner, which operates as a closure member for the tube 33. At the front side of the tube and adjacent the front slot 34, is a series of calibrations running from 0 to 32 respectively, in the form shown, which calibrations serve to indicate the quantity of lubricant expelled from the container as will hereinafter be more fully described. The rod 32 has an indicating member 37 secured to the upper end thereof by means of a screw 38, the said indicating member extending outward and having a point 39 formed thereon, the said point extending to one side of the tube adjacent the rows of calibrations as indicated in Figures 1 and 4, the upper indicating edge of said point being substantially horizontal and even with the top of the piston rod 32. Also mounted in the tube 33 is a plug 40 having a flexible member 41 secured to the upper side thereof by means of a screw and plate connection 42, the member 41 being composed of rubber, leather or any flexible material, and which is adapted to hold the plug 40 in frictional engagement with the inner side of the tube 33 but allows for ready movement of the plug 40 inside the tube 33. A pair of buttoms or thumb screws 43 and 44 are provided which are inserted or threaded into the plug 40 through the slots 34 and 35 respectively, in the tube 33 and provide means by which the plug 40 is manually moved in the tube 33. At the lower side of the plug 40 an indicator 45 is provided which is secured to the said plug by a screw 46, the said indicator extending outward through the slot 34 and having a point 47 thereon adapted to project toward the calibrations on the tube 33. When the indicator 37 mounted on the upper end of the rod 32, and the indicator 45 mounted upon the plug, are positioned together, the points 39 on the indicator 37, and 47 on the indicator 45, form an arrow head with the central points of these two indicating members forming the point of the arrow which extends toward the calibrations on the tube 33. The body portions of the members 37 and 45 present parallel surfaces when brought into engagement with each other so they fit snugly together, forming the arrow point described above. Adjacent the upper end of the rod 32 is a flattened portion 48 so that when the piston 22 is driven to the bottom of the container 10, and the flattened portion of the rod passes through the gland members, a vent is formed through the glands allowing the compressed fluid to escape to the atmosphere so that damage will not result to the device by attempting to force a further quantity of lubricant from the container after the follower has reached the bottom of the container 10 and the container has been emptied.

The operation of the device is exceedingly simple in that after the container 10 has been filled with lubricant, a compressed fluid, such as air and the like, is supplied to the upper part of the container 10, preferably to a pressure of approximately 45 pounds, this supply of compressed air being obtained from any suitable source such as a filling station or the like, the pressure of this fluid being indicated by the gauge 19. The pressure in the upper part of the container forces the piston 22 into contact with the lubricant in the lower portion of the container 10, in which position the indicator 37 discloses to the observer the amount of lubricant in the container 10. In this position the plug 40 is moved manually down the tube until the indicators 45 and 37 are in contact with each other. When it is desired to eject lubricant from the container into say a transmission housing, the nozzle 17 is inserted into the opening in the transmission housing, the valve 15 opened by means of the handle 16, whereupon the fluid pressure in the upper portion of the container may force the piston down expelling the lubricant through hose 14 into the transmission housing, the rod 32 travelling downward at the same time. When the transmission housing is filled or the desired quantity of lubricant has been injected into the housing, the indicator 37 will have travelled down, leaving the plug 40 in a stationary position and indicating the point from which the indicator 37 began its travel, so that by referring to the calibrations on the side of the tube 33 and which may be spaced to indicate pounds of lubricant based upon the internal diameter of the container 10 and the predetermined travel of the piston 22, the number of calibrations between the upper indicator 45 and the lower indicator 37, determines the number of pounds of lubricant which have been ejected from the container 10. After this operation is complete, the plug 40 is moved downward so that the two indicators are again in engagement with each other so that the device is ready for another operation and this process is continued until all of the lubricant is ejected from the container 10.

When it is desired to fill the container 10 with lubricant, the valve 20 is opened and the nozzle 17 attached to any power filling apparatus and lubricant forced backwards through the nozzle 17, the valve 15 being opened in the meantime so that the container 10 is filled with lubricant, the compressed fluid in the upper portion of the container 10 being forced out through the valve 20. The rod 32 in the meantime travels upward through the tube 33, carrying with it the indicator 37 and pushing the plug 40 upward at the same time, it being understood that the thumb screws 43 and 44 have been loosened prior to the filling action. Thereupon compressed fluid is forced into the upper part of the container 10 and as the follower is forced downward by this fluid, the plug 40 is moved downward so the indicator members 45 and 37 are in engagement with each other, whereupon the device is ready for another filling operation.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. A portable lubricant dispenser comprising in combination, a container, a piston dividing said container into two compartments, one of said compartments being adapted to confine a compressed fluid and the other adapted to contain a lubricant, a lubricant conductor connected to said container, a valve in said conductor, a rod connected to the piston, a calibrated tube secured to said container into which the said rod projects, an indicator movable with said rod and along said calibrations, and a manually movable normally stationary indicator mounted in said tube, said indicator being adapted to cooperate with said first named indicator to determine quantities of lubricant discharged and forming a stop for said rod to thereby indicate each initial reading of said calibrations for computing the amount of lubricant discharged at each operation of said dispenser.

2. In a device of the character described, the combination of a lubricant carrying container having discharge conducting means connected thereto, a pressure actuated piston reciprocally mounted in said container for discharging said lubricant, means whereby pressure may be introduced to said container and piston, a piston rod extending on the outside of said container having means for relieving pressure from said container when said piston has reached a predetermined point, indicating means on said piston rod, a calibrated member associated with said indicating means, and adjustable means on said calibrated member for cooperating with said indicating means to form a stop to indicate each initial reading of said calibrations whereby discharge of lubricant from said container may be ascertained regardless of the amount of lubricant disposed in said container.

Signed at Chicago, Illinois, this 30th day of November, 1926.

ROLLIN H. MOULTON.